(12) United States Patent
Doron et al.

(10) Patent No.: US 9,450,981 B2
(45) Date of Patent: Sep. 20, 2016

(54) SYSTEM AND METHOD THEREOF FOR MITIGATING DENIAL OF SERVICE ATTACKS IN VIRTUAL NETWORKS

(71) Applicant: Radware, Ltd., Tel Aviv (IL)

(72) Inventors: Ehud Doron, Moddi'in (IL); Avi Chesla, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 111 days.

(21) Appl. No.: 13/828,043

(22) Filed: Mar. 14, 2013

(65) Prior Publication Data

US 2014/0283051 A1    Sep. 18, 2014

(51) Int. Cl.
*H04L 29/06* (2006.01)
*H04L 12/24* (2006.01)

(52) U.S. Cl.
CPC ....... *H04L 63/1458* (2013.01); *H04L 12/2417* (2013.01); *H04L 12/2465* (2013.01); *H04L 12/2472* (2013.01)

(58) Field of Classification Search
CPC .......... H04L 63/1458; H04L 12/2417; H04L 12/2465; H04L 12/2472
USPC ......................................................... 726/22
See application file for complete search history.

(56) References Cited

U.S. PATENT DOCUMENTS

| | | | |
|---|---|---|---|
| 7,436,770 B2 * | 10/2008 | Sterne et al. | 370/235 |
| 8,549,646 B2 * | 10/2013 | Stavrou et al. | 726/24 |
| 8,718,064 B2 * | 5/2014 | Beliveau et al. | 370/392 |
| 8,909,800 B1 * | 12/2014 | Grebenschikov | G06F 9/45558 709/223 |
| 2001/0010053 A1 | 7/2001 | Ben-Shachar et al. | |
| 2003/0115480 A1 * | 6/2003 | McDysan | 713/201 |
| 2005/0259646 A1 * | 11/2005 | Smith | H04L 12/66 370/389 |
| 2007/0199061 A1 * | 8/2007 | Byres et al. | 726/11 |
| 2007/0214505 A1 * | 9/2007 | Stavrou | G06F 21/55 726/24 |
| 2008/0172539 A1 * | 7/2008 | Boss | G06F 3/0605 711/165 |
| 2008/0222375 A1 | 9/2008 | Kotsovinos et al. | |
| 2009/0037592 A1 * | 2/2009 | Lyon | H04L 29/06027 709/228 |
| 2009/0094671 A1 * | 4/2009 | Kurapati | H04L 63/1458 726/1 |
| 2009/0279444 A1 * | 11/2009 | Ravindran et al. | 370/252 |
| 2010/0077395 A1 * | 3/2010 | Edwards | H04L 12/66 718/1 |
| 2010/0333089 A1 * | 12/2010 | Talwar | G06F 11/004 718/1 |
| 2012/0096459 A1 | 4/2012 | Miyazaki | |
| 2012/0124306 A1 * | 5/2012 | Abercrombie | G06F 11/1461 711/162 |
| 2012/0137292 A1 | 5/2012 | Iwamatsu et al. | |
| 2012/0159634 A1 | 6/2012 | Haikney et al. | |

(Continued)

OTHER PUBLICATIONS

Latanicki et al, "Scalable Cloud Defenses for Detection, Analysis and Mitigation of DDoS Attack", Towards the Future Internet, G. Tselentis et al. IOS Press, 2010, p. 127-137.*

*Primary Examiner* — Hadi Armouche
*Assistant Examiner* — Sher A Khan
(74) *Attorney, Agent, or Firm* — M&B IP Analysts, LLC (57) ABSTRACT

A method for efficient mitigation of denial of service (DoS) attacks in a virtual network. The method maintains a security service level agreement (SLA) guaranteed to protected objects. The method includes ascertaining that a denial of service (DoS) attack is performed in the virtual network; checking if the DoS attack affects at least one physical machine hosting at least one protected object, wherein the protected object is provisioned with at least a guaranteed security service level agreement (SLA); determining, by a central controller of the virtual network, an optimal mitigation action to ensure the at least one security SLA guaranteed to the least one protected object; and executing the determined optimal mitigation action to mitigate the DoS attack, wherein the optimal mitigation action is facilitated by resources of the virtual network.

23 Claims, 4 Drawing Sheets

(56) References Cited

U.S. PATENT DOCUMENTS

| | | |
|---|---|---|
| 2012/0185856 A1 | 7/2012 | Ashihara et al. |
| 2013/0055010 A1 | 2/2013 | Kotha et al. |
| 2013/0060940 A1* | 3/2013 | Koponen ............ H04L 12/4633 709/225 |
| 2013/0070762 A1 | 3/2013 | Adams et al. |
| 2013/0124712 A1* | 5/2013 | Parker ................ H04L 41/5038 709/224 |
| 2013/0134712 A1* | 5/2013 | Rodriguez Tsouroukdissian ... F03D 11/028 290/44 |
| 2013/0160008 A1* | 6/2013 | Cawlfield et al. ................ 718/1 |
| 2013/0198845 A1* | 8/2013 | Anvari .................... G06F 21/85 726/25 |
| 2013/0219043 A1* | 8/2013 | Steiner et al. ................ 709/224 |
| 2013/0263256 A1* | 10/2013 | Dickinson et al. ............. 726/22 |
| 2014/0204957 A1* | 7/2014 | Kanda et al. ................ 370/431 |

* cited by examiner

SYSTEM AND METHOD THEREOF FOR MITIGATING DENIAL OF SERVICE ATTACKS IN VIRTUAL NETWORKS

TECHNICAL FIELD

This invention generally relates to virtual networks, and particularly to techniques for guaranteeing continuous service by computing resources that are connected to such networks.

BACKGROUND

A virtual machine (VM) is a software implementation of a computer that executes programs in a way that is similar to a physical machine. The virtualization technology allows the sharing of the underlying physical hardware resources between different virtual machines, each running its own operating system (as a guest), and a set of applications. Virtualization of computing and networking resources, such as servers, application delivery controllers (ADCs), and load balancers can improve the performance and resource utilizations of datacenters. Further, virtualization of such resources may reduce costs and overhead to the service providers. This can be achieved without compromising the isolation and independence of the physical machines, and the VMs hosted therein.

The isolation and independence of VMs allow creating "tenants" and providing multi-tenancy support in a datacenter. A "tenant" is a group of one more VMs hosted in a physical machine and provisioned to provide services to a particular customer, for example, based on a service-level agreement (SLA). Virtualization further provides a high level of dynamics. For example, VMs can be dynamically created, deleted, powered-on/off, added, or removed from their physical machines. The dynamic characteristics of VMs and virtual environments drive their utilization in network infrastructures (e.g., datacenters, private cloud, public cloud, etc.) which require high scalability. However, such requirements impose a great challenge on existing traditional networks, which are static and suffer from scalability limitations (e.g., flooding and STP).

To efficiently support virtualization technologies and multi-tenancy, virtualized networking architectures or virtual networks are proposed. An approach to build a virtual network is provided by the software defined networking (SDN). The SDN allows building a networking architecture that provides centralized management of network elements rather than a distributed architecture utilized by conventional networks. That is, in a distributed architecture each network element makes a routing decision based on the results of traffic processing and a distributed control mechanism. In contrast, in the SDN, a network element follows networking operations, such as routing decisions received from a central controller. The SDN can be implemented in wide area networks (WANs), local area networks (LANs), the Internet, metropolitan area networks (MANs), internet service provider (ISP) backbones, datacenters, and the like. A SDN-based network element is typically a switch that routes traffic according to the control of the central controller. The SDN may also include "standard" (or traditional) routers, switches, bridges, load balancers, and so on, as well as any virtual instantiations thereof.

In one configuration of a SDN, the central controller communicates with the network elements using an OpenFlow protocol which provides a network abstraction layer for such communication. Specifically, the OpenFlow protocol allows adding programmability to network elements for the purpose of packets-processing operations under the control of the central controller, thereby allowing the central controller to define the traffic handling decisions in the network element. To this end, traffic received by a network element that supports the OpenFlow protocol is processed and routed according to a set of rules defined by the central controller.

One type of virtual network is defined as a SDN based overlay networking architecture which is based on an overlay logical link established over the physical transport network. Overlay logical links are tunneled through the underlying physical networks using dedicated tunnel encapsulation performed by network virtualization edge devices, such as virtual switches and dedicated overlay gateways.

A significant problem facing the Internet community is that on-line businesses and organizations are vulnerable to malicious attacks. Recently, attacks have been committed using a wide arsenal of attack techniques and tools targeting both the information maintained by the on-line businesses and their IT infrastructure. Hackers and attackers are constantly trying to improve their attacks to cause irrecoverable damage, to overcome currently deployed protection mechanisms, and so on.

One of the common attacks against network infrastructures, such as datacenters and cloud-based infrastructures, includes denial-of-service (DoS) and distributed (DDoS) attacks (commonly referred to hereinafter as DoS attacks). Virtualized networking architectures, or virtual networks, expose some tenants to DoS attacks even when such tenants are not intentionally targeted by the attacker. This is due to the fact that multiple tenants share the same physical machine with a VM which may be targeted for the attack.

Figure 4:
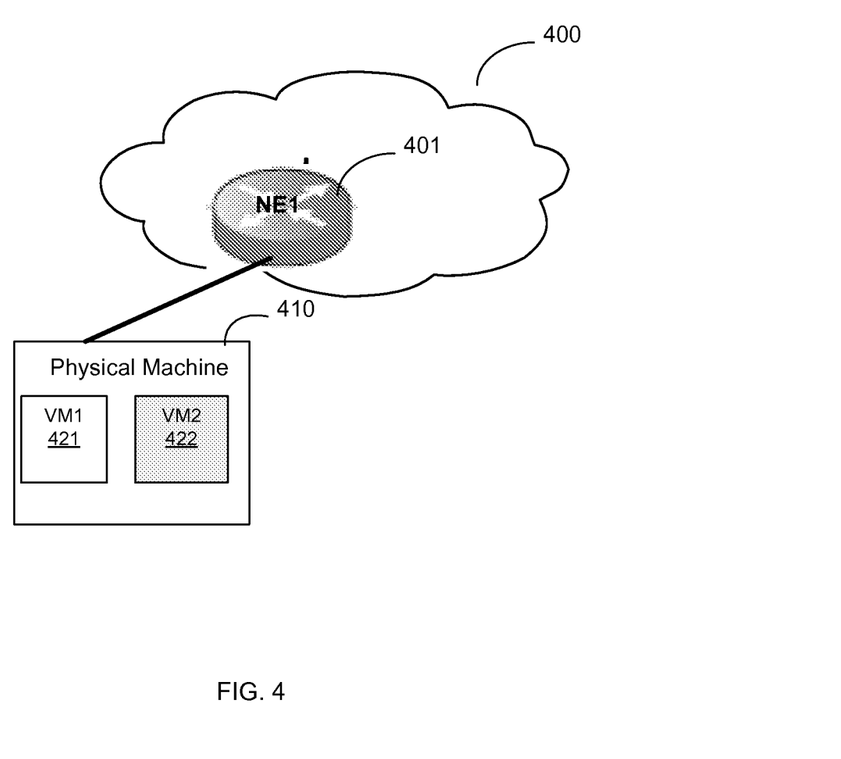
FIG. 4 is a diagram illustrating the deficiencies of protecting tenants during conventional VMs deployment.

A non-limiting example is illustrated in FIG. 4. In a network 400 there are shown, a physical machine 410 (e.g., a physical server) that hosts two VMs: VM 421 and VM 422. A DoS attack directed to VM 421 affects the connectivity to physical machine 410 and/or a network element 401 connected thereto, which thereby can also cause VM 422 to become unavailable. This problem can significantly downgrade the quality of service (QoS) provided to the VMs 421 and 422, and in particular, when the VMs are provisioned with different security service-level agreements (SLAs) to support different tenants.

For example, the VM 422 is provisioned with a security SLA including anti-DoS attack services, while the VM 421 is configured without any security services at all. The VM 421 and VM 422 are allocated to different tenants (customers). When the VM 421 is under DoS attack, the physical machine PM 410 is also affected, and thereby access to both VMs and their respective tenants is denied. While security services are not guaranteed to VM 421, the QoS to VM 422 cannot be guaranteed.

As can be understood from this example, the segregation and isolation of VMs hosted in physical machines connected in virtualized networking architectures are compromised at least during DoS attacks. As a result, organizations and businesses lose revenue due to security-related downtime during instances when the service-level agreement (SLA) cannot be guaranteed to the paying customers.

A simple solution herein can be to provision both VMs with Anti-DoS services, still this solution is not efficient. It would be therefore advantageous to provide an efficient solution that ensures continuous services and the guaranteed security SLA for a group of paying tenants during cyber-attacks, and particularly during DoS attacks.

SUMMARY

Certain embodiments disclosed herein include a method for efficient mitigation of denial of service (DoS) attacks in a virtual network to maintain a security service level agreement (SLA) guaranteed to protected objects. The method comprises ascertaining that a denial of service (DoS) attack is performed in the virtual network; checking if the DoS attack affects at least one physical machine hosting at least one protected object, wherein the protected object is provisioned with at least a guaranteed security service level agreement (SLA); determining, by a central controller of the virtual network, an optimal mitigation action to ensure the at least one security SLA guaranteed to the least one protected object; and executing the determined optimal mitigation action to mitigate the DoS attack, wherein the optimal mitigation action is facilitated by means of resources of the virtual network.

Certain embodiments disclosed herein also include a system for efficient mitigation of denial of service (DoS) attacks in a virtual network to maintain a security service level agreement (SLA) guaranteed to protected objects. The system comprises a mitigation module for ascertaining that a denial of service (DoS) attack is performed in the virtual network, the mitigation module is further configured to check if the DoS attack affects at least one physical machine hosting at least one protected object and determines an optimal mitigation action to ensure at least one security SLA guaranteed to the at least one protected object; and a network-interface module for instructing the network elements to divert traffic directed to the at least one physical machine to a secured resource, wherein the secured resource is set by the optimal mitigation action.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 1:
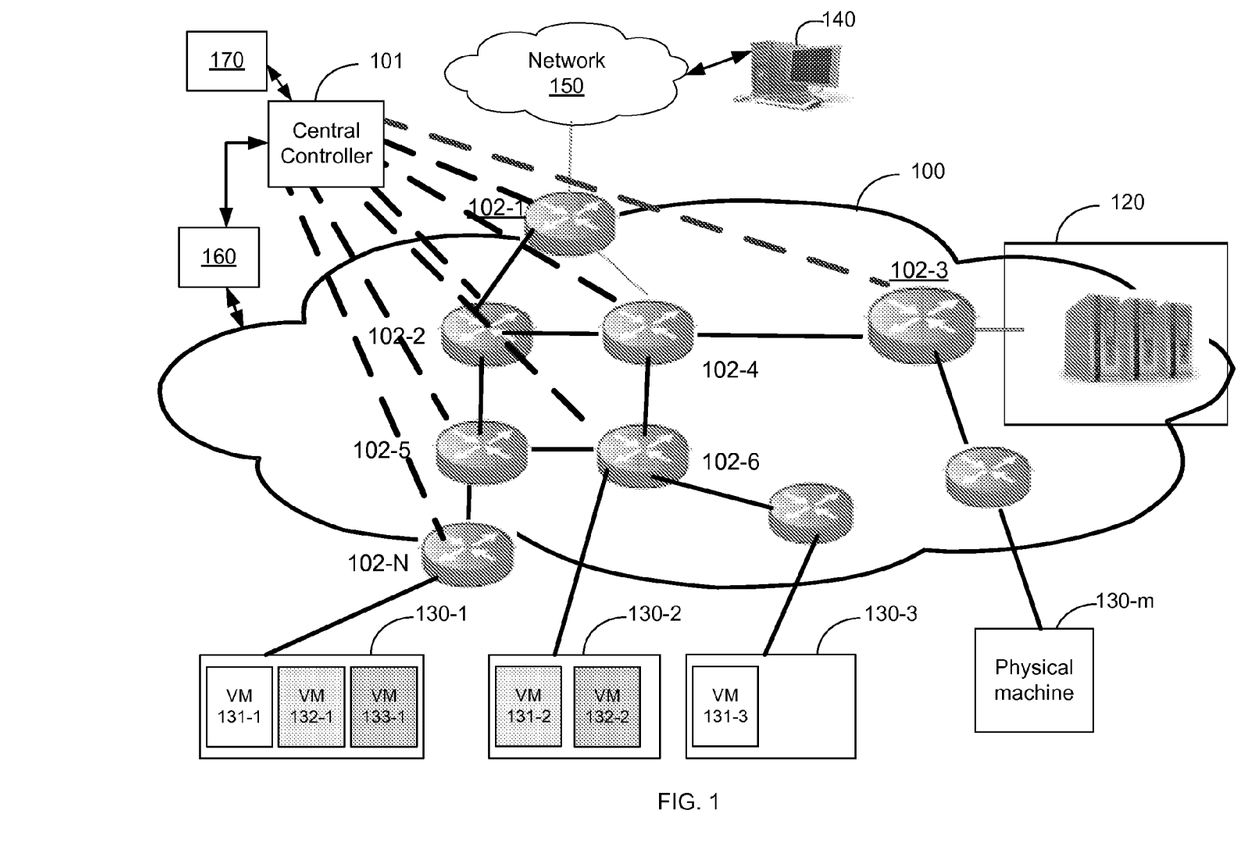
FIG. 1 illustrates a diagram of a virtual network utilized to describe the various embodiments of the invention.

FIG. 1 is an exemplary and non-limiting diagram illustrating a topology of a virtual network 100 utilized to describe the various embodiments disclosed herein. The virtual network 100 includes a central controller 101 and a plurality of network elements 102-1 through 102-N. To virtual network 100 are further connected a security system 120, a plurality of physical machines 130-1 through 130-m, and a client 140. The client 140 utilizes services from VMs hosted in the physical machines 130, where the communication is established over a legacy network 150 and the virtual network 100. The legacy network 150 may be, for example, a WAN, a LAN, the Internet, an Internet service provider (ISP) backbone, a corporate network, a datacenter, and the like.

The client 140 may be a legitimate client or an attack tool. It should be noted that although one client 140 and one security system 120 are depicted in FIG. 1 merely for the sake of simplicity, the embodiments disclosed herein can be applied to a plurality of clients and security systems. The architecture of the virtual network 100 and the physical machines connected thereto, are utilized in datacenters, cloud-based infrastructure, and the like.

Each of the physical machines 130-1 through 130-m hosts one or more virtual machines (VMs). For example, a physical machine 130-1 hosts the VMs 131-1, 132-1 and 133-1 the physical machine 130-2 hosts VMs 131-2 and 132-2, while the physical machine 130-3 hosts VM 131-3. The hosted VM may be configured with different security SLAs. For example, the VM 131-1 may be provisioned to provide a high security SLA, including DoS mitigation features, while VM 133-3 may be provisioned with no security SLA at all.

According to various embodiments disclosed herein, at least two zones are configured in the virtual network 100: a low SLA zone (LSZ) and a high SLA zone (HSZ). The HSZ includes computing resources, such as physical machines, and inline security devices selected and provisioned to provide high SLA including, but not limited to, a security SLA guaranteed to each protected object (or "paying customer). In a preferred embodiment, the computing resources in the HSZ ensure continuous operating in an event of a DoS attack against the protected object. For example, the physical machines in the HSZ are connected to network elements with high bandwidth capability, and are machines with high processing power, high network bandwidth, and so on. In one embodiment, physical machines in the HSZ can be pre-allocated and/or dynamically assigned to the HSZ to process traffic during a DoS attack, as the case may be.

In contrast to the HSZ, the LSZ includes physical machines (computing resources) that are not required to ensure SLAs. It should be noted that some physical machines are allocated to neither one of the HSZ or the LSZ. For the sake of simplicity and without limiting the scope of the disclosed embodiments, the physical machine 130-2 is allocated to the LSZ, the physical machine 130-3 is allocated to the HSZ, and the physical machines 130-1 and 130-m do not belong to any of the zones.

According to one embodiment, security services including, but not limited to, DoS attacks detection and mitigation services are provided to a set of predefined protected objects. A protected object is a VM or a group of VMs assigned to a tenant (e.g., a paying customer) being entitled to receive security services defined in a SLA. A protected object may be configured by an IP address for a dedicated server (a single VM) protection, or by a variable size subnet for a network protection (a group of VMs). The protected object, in one embodiment, can be a server.

The security system 120 processes traffic for the purpose of mitigating and terminating DoS (including DDoS) attacks. In one embodiment, the security system 120 is deployed as a "scrubbing center", i.e., an out-of-path deployment. Typically, suspicious traffic is passed through a scrubbing center (the system 120) only during a DoS attack, which performs one or more mitigation actions on the incoming traffic and forwards legitimate clean traffic back to the network. In an embodiment, the system 120 acts as a security server that detects and mitigates encrypted and large-scale DoS/DDoS attacks as detailed, for example, in U.S. patent application Ser. Nos. 13/425,978 and 13/306,360 to Chesla, et al., and hereby incorporated by reference. The security system 120 may be configured as a virtual appliance or physical appliance.

In certain embodiments, an attack detection tool 160 and a virtualization manager 170 are connected to the central controller 101 of the virtual network 100. The communication of the central controller 101 with the security system 120, detection tool 160, and virtualization manager 170 may be achieved through application programming interfaces (APIs).

The attack detection tool 160 provides an indication to the controller 101, if the traffic directed to one of the VMs is suspected of including DoS threats. The detection is based on network and bandwidth statistics, such as an average number of active connections, an average number of packets received per second, and so on. Other techniques, discussed in the related art, for detection of DoS attacks can be implemented by the tool 160. In another embodiment, the central controller 101 implements the detection techniques to detect DoS attacks.

A detection of a DoS attack, either by the tool 160 or the controller 101, can be performed for each object, protected or unprotected, with granularity of a specific traffic portion/protocol: TCP, UDP, ICMP, and the like. The attack can also be detected for specific L4 service (TCP or UDP port). The virtualization manager 170 manages VMs in the physical machines 130. This includes, but is not limited to, migrating, creating, deleting, and adding VMs. A migration of a VM occurs from one physical machine to another. Typically, a VM migration process is performed by incrementally copying the memory image of the VM including the content of its registers, from a source physical machine to a target physical machine. Once the memory image has been copied, the execution of the VM on the source physical machine is halted, and execution then resumes on the target physical machine. The execution of the VM on the target machine is resumed from the next instruction subsequent to the instruction step in which it was stopped.

The virtual network 100 may be based on the networking architectures including, for example, a software defined network (SDN), a SDN based overlay network, and the like. As noted above, in a SDN the central controller 101 may communicate with the network elements 102 using, for example, an OpenFlow protocol which provides a network abstraction layer for such communication. In a SDN based overlay network, the controller 101 manages network elements 102 and other devices connected to the network through an address dissemination process.

According to various embodiments disclosed herein, the central controller 101 carries out a process that ensures continuous and uninterrupted services to protected objects during a DoS attack, thereby providing the guaranteed SLA. It should be noted that the attack may be performed against the protected object or VM(s) in the vicinity of the protected object (e.g., VM(s) in the same physical machine(s) as the protected object). The central controller 101, upon detection of the DoS attack against a protected object, performs one or more mitigation actions designed to allow the protected object to provide the guaranteed SLA. In one embodiment, an indication of a detected attack including the recommended mitigation action is sent as an alert to a security manager who can trigger the attack mitigation procedures.

The mitigation actions performed by the central controller 101 are described herein with a reference to the exemplary and non-limiting configuration of VMs 131-1, 132-1, and 133-1 hosted in the physical machine 130-1. According to this example, the VM 131-1 is a protected object, i.e., provisioned with security SLA, while VMs 132-1 and 133-1 are unprotected objects. Thus, the detection tool 160 and/or the controller 101 monitors traffic and detects attacks addressed to the VMs hosted in the physical machines.

When the controller 101 receives or detects a DoS attack against any of the VMs hosted in the physical machine 130-1 (i.e., that includes the protected object (VM 131-1)), the controller 101 determines which mitigation action to execute and on which entity. The entity may be any of the VMs hosted in the physical machine 130-1 or traffic directed thereto. The controller 101 performs one or more of the following mitigation actions: traffic diversion and migration of one or more protected objects or one or more unprotected objects. In one embodiment, the determination of which mitigation action to perform is based, in part, on the available computing resources, including, but not limited to, mitigation resources with the aim of minimizing the consumption of such resources. That is, the controller 101 is configured to efficiently mitigate the attack against protected objects with minimal consumption of computing and mitigation resources.

The traffic diversion includes rerouting incoming traffic originally directed to the protected object, first to the security system 120, and then injecting clean traffic processed by the system 120 back to the network 100, to then be sent to the protected object (e.g., VM 131-1). The security system 120 applies one or more DoS mitigation techniques on the incoming traffic. Such techniques include, but are not limited to, SYN attack protection, packet anomalies detection, and so on.

It should be emphasized that the diversion of suspicious traffic is performed on-the-fly without prior provisioning of the network elements 102. Various embodiments can be utilized for traffic diversion and injections. In one embodiment, the controller 101 configures the flow table of each network element 102 to direct traffic to the security system 120 and back to the destination of the protected object. In another embodiment, dedicated APIs in the central controller 101 allow configuring the controller 101 to perform traffic diversion. In yet another embodiment, in a SDN based overlay network architecture network, the controller 101 instructs an overlay gateway to send traffic addressed to the protected object through a tunnel that passes through system 120 instead of through the original tunnel.

The central controller 101 monitors the condition of the protected object, by querying the security system 120 to check if the attack has been alleviated. If not, the controller 101 continues to divert traffic to the system 120 and/or utilize a different mitigation action, such as migration of the protected object. If the DoS attack has been terminated, then the controller 101 stops the traffic diversion.

Other action includes migrating the one or more VMs associated with the protected object to the HSZ. The migration process is performed by the virtualization manager 170 when instructed by the central controller 101. In this example, the VM 131-1 (which is the protected object) is migrated to a physical machine 130-3. As mentioned earlier, the HSZ is an isolated area in the network that includes computing and networking resources, such as physical machines and inline security devices designed or configured to provide the SLA that is guaranteed to the protected object during an on-going DoS attack. Thus, migrating the protected object to a zone that is over-provisioned with computing and networking resources significantly reduces the probability that an attacker would succeed in its attempt to cause the protected object to become unavailable.

It should be noted that the protected object can also be migrated to the HSZ when an attack is committed against the unprotected objects, e.g., VM 132-1 and/or 133-1 in the machine 130-1. Although the on-going DoS attack is not directed against a protected object (VM 131-1), the guaranteed SLA can be easily supported by placing the VM 131-1 in the HSZ. When the controller 101 detects or receives an indication that the DoS attack has been terminated, the controller 101 instructs the virtualization manger 170 to migrate the protected object back to its original physical machine. That is, the VM 131-1 is migrated back to the physical machine 130-1. The protected object can also be migrated to any physical machine outside the HSZ Another mitigation action performed by the central controller includes the migration of VMs not defined as protected objects, to the LSZ. This action is taken when a DoS attack is performed against one or more VMs that are not protected objects. The objective of this mitigation action is to provide the SLA that has been guaranteed to the protected objects, by eliminating the attacker traffic from reaching the physical machines where the protected objects are hosted. For example, if a DoS attack is performed against VM 132-1, the central controller 101 instructs the virtualization manager 170 to migrate the VM 132-1 to the physical machine 130-2 located in the LSZ.

As mentioned earlier, the determination of which mitigation action to perform is made based on the available computing and mitigation resources with the aim of minimizing the consumption of such relatively expensive resources. In one embodiment, the determination is based on a configuration of the physical machine including the number of protected objects versus unprotected objects hosted in a physical machine to which the attack traffic is directed. Specifically, the number of protected objects is compared to a predefined threshold. If that number exceeds that threshold and the attack is against the unprotected objects, then the unprotected objects are migrated to LSZ. For example, if such a physical machine hosts 100 VMs, 99 of which are protected and 1 becomes an unprotected object under attack, and there is a shortage of mitigation resources, then the unprotected object (VM) is migrated to the LSZ.

Alternatively, if the number of protected objects is below the threshold and the attack is against the unprotected objects, then the protected objects are migrated to HSZ. As an example, if such a physical machine's host is configured with 99 unprotected objects being under attack, and 1 protected object, then the protected object (VM) is migrated to the HSZ, if the attack is addressed to one or more unprotected objects. In the above example, the threshold has been set to 10, i.e., a tenth of the number of VMs hosted by the physical machine.

It is further determined if the number of protected and unprotected objects which are under attack is substantially equal, for example, by comparing the ratio of the protected and unprotected objects to another threshold. In such a case, the traffic to the protected objects may be diverted through the security system 100. It should be noted that different actions can be performed on different objects. For example, some protected objects hosted in a physical machine may be migrated to the HSZ, while traffic to other protected objects in the same machine may be diverted through the security system 120.

In another embodiment, the determination of the efficient action is based, in part, on a current load of physical machines, or other resources, in the HSZ and/or the security system 120. For example, if the system 120 is loaded for cleaning traffic of other objects in the network 100, diverting traffic of additional objects to the system 120 would not be the optimal action. It should be noted that mitigation action can be determined based on any one of, or any combination of, the current load of resources in the HLZs and system 120, current available resources in the HLZs, and the configuration of a physical machine hosting the protected objects, i.e., allocation of protected and unprotected objects in the physical machine.

Figure 2:
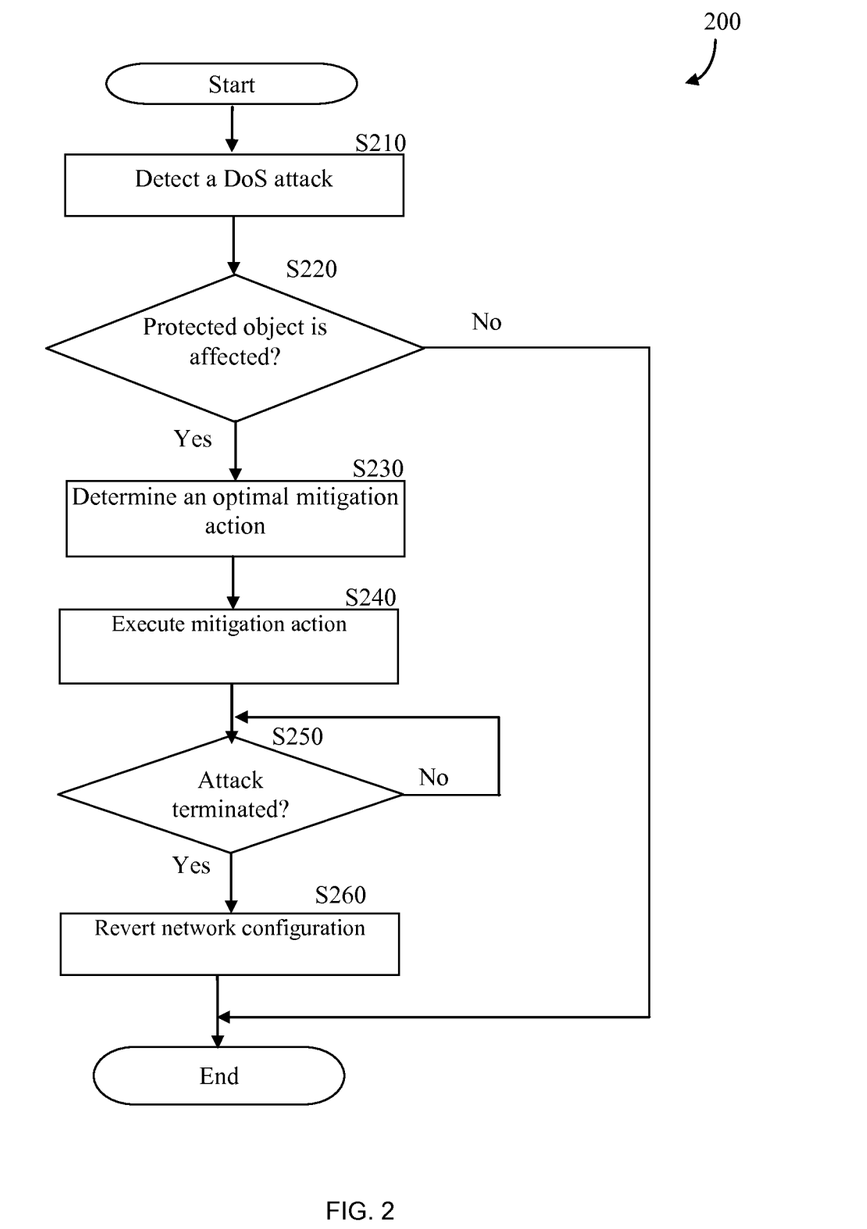
FIG. 2 is a flowchart describing a method for mitigating DoS attacks against protected objects according to one embodiment.

FIG. 2 shows a non-limiting and exemplary flowchart 200 describing a method for enabling the continuous operation of protected objects during DoS attacks according to one embodiment. As noted above, protected objects include VMs assigned to customers with guaranteed high security SLA. In an embodiment, the method is performed by a central controller (e.g., controller 101) of a virtual network, e.g., network 100. The method is also described with a reference to the components shown in FIG. 1.

The method starts at S210, when the central controller 101 ascertains that a DoS attack is performed in the virtual network. The attack indication designates which object, unprotected or protected (VM) is under attack. As discussed in detail above, the attack can be detected by means of the attack detection tool 160 or the central controller 101.

At S220, a check is made to determine if the on-going DoS attack affects at least one physical machine hosing one or more protected objects. The DoS attack is determined to affect such a machine if the DoS attack is committed against at least one protected object or unprotected object hosted therein. The check can be performed, for example, by querying the virtualization manager 170 to find out what types of objects are hosted in a particular machine. If S220 results with an affirmative answer, execution continues with S230; otherwise, execution ends.

At S230, at least one optimal mitigation action to be applied on objects in the physical machine receiving the attack traffic is determined. The mitigation action can be migration of one or more protected objects to a HSZ, migration of one or more unprotected objects to a LSZ, diverting traffic directed to the protected objects to the security system 120, or any combination thereof. The optimal mitigation action is determined based, in part, on a current load of physical machines in the HSZ and/or the security system 120, available resources in the HSZ, and the configuration of the physical machine receiving the attack traffic.

At S240, the selected mitigation action is executed. Specifically, in the diversion action, the network elements 102 of the virtual networks are instructed by the central controller 101 to divert traffic addressed to the targeted protected object through the security engine 120. As noted above, the security engine 120 applies one or more DoS mitigation techniques on the received traffic to produce 'clean' traffic, which is then sent to the protected object. The various techniques for diverting the traffic in the virtual networks are discussed in detail above.

The migration action includes VM migration of each protected or unprotected object to a different zone in the network. The one or more protected objects hosted in a physical machine receiving the attack traffic are migrated to the HSZ. For example, the protected VM 131-1 is migrated to the physical machine 130-3 located in a HSZ. As noted above, the HSZ includes computing and network resources that are provisioned to support the SLA guaranteed to the protected object. Migration of the unprotected objects includes migrating at least one VM which is the target of a DoS attack, hosted in the machine receiving the attack traffic, to the LSZ.

At S250, it is checked if the detected DoS attack has been terminated. If so, execution continues with S260; otherwise, execution waits at S250. At S260, the controller 101 reverts the virtual network 100 to a configuration prior to the execution of the migration action. That is, the migrated protected or unprotected objects are instantiated on the original physical machine or another physical machine located in the original zone. If the traffic was diverted through the system 120, then the network elements 102 are instructed to direct traffic to the original route.

It should be noted that the method ensures that the protected objects will have the sufficient computing and network resources to provide the guaranteed services. This is performed by at least one of: mitigating the attacks by diverting protected object traffic to cleaning center, moving the protected objects to the HSZ, and migrating VMs under attack which are not provisioned as protected objects to the LSZ. The mitigation actions are realized without prior configuration of the network elements. Furthermore, all the mitigation actions are agnostic to the type of the Internet protocol. For example, the mitigation actions (i.e., traffic diversion and VMs migration) disclosed herein can be performed for any type of application layer (e.g., HTTP, SIP, etc.) and any type of transport protocol (e.g., SMTP, UDP, etc.).

Figure 3:
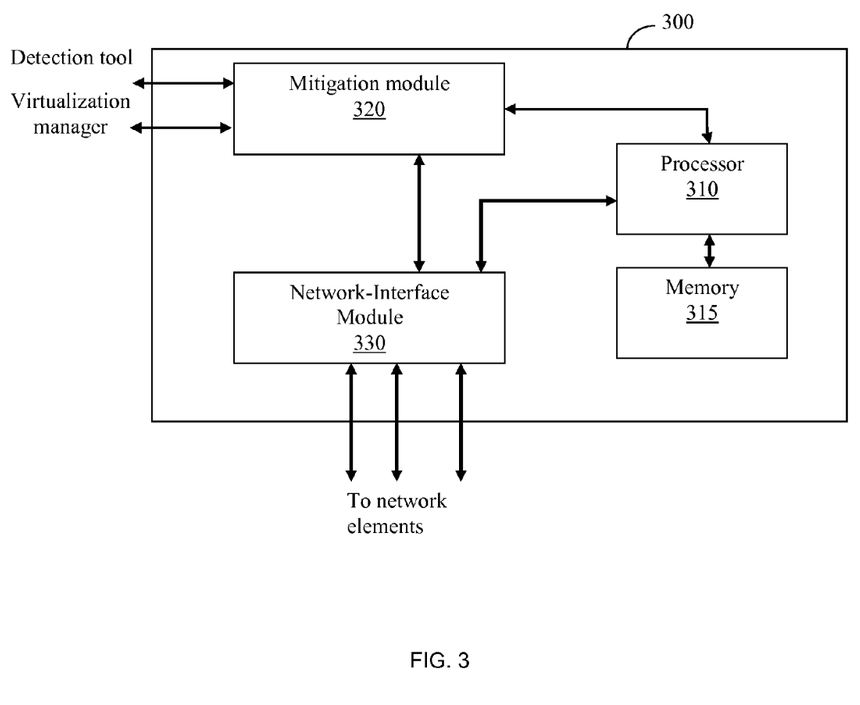
FIG. 3 is a block diagram of the central controller constructed according to one embodiment.

FIG. 3 shows an exemplary and non-limiting block diagram of the central controller 300 constructed according to one embodiment. The central controller 300 is operable in virtual networks. The controller 300 is configured to at least execute the methods described in greater detail above.

The controller 300 includes a processor 310 coupled to a memory 315, a mitigation module 320, and a network-interface module 330. The mitigation module 320 determines if there is an on-going attack in the network and performs one or more of the mitigation actions as discussed in detail above. The mitigation module 320 interfaces with the attack detection tool 160 to receive attack indications and statistics. The module 320 also interfaces with the virtualization manager 170 to provide instructions to migrate VMs. In addition, in one embodiment, the mitigation module 320 queries the virtualization manager 170 as to the type of SLA with which each VM is configured, i.e., to determine if a VM is a protected object and to get its location within a physical host. In certain implementations, the mitigation module 320 is configured with the information as to which VMs are protected and which are unprotected.

The network-interface module 330 allows the communication with the network elements of the virtual network. The communication is performed in part to instruct the network elements to divert the traffic to the security system 100, LSZ, and HSL. In one embodiment, such communication uses, for example, the OpenFlow protocol discussed above, through a secure channel established with each network element. In another embodiment, the communication is achieved through a control channel. The network-interface module 330 also communicates with the mitigation module 320 to provide traffic statistics gathered by the network elements. The module 320 also provides traffic diversion instructions and rules to the network elements through the network-interface 330, when a diversion action is performed. The processor 310 uses instructions stored in the memory 315 to execute tasks traditionally performed by the central controllers of virtual networks.

The foregoing detailed description has set forth a few of the many forms that different embodiments of the invention can take. It is intended that the foregoing detailed description be understood as an illustration of selected forms that the invention can take and not as a limitation as to the definition of the invention.

Most preferably, the various embodiments discussed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for efficient mitigation of denial of service (DoS) attacks in a virtual network to maintain a security service level agreement (SLA) guarantee to protected objects, comprising:
    ascertaining, by a central controller of the virtual network, that a denial of service (DoS) attack is performed in the virtual network;
    checking if the DoS attack affects at least one physical machine, the at least one physical machine hosting at least one protected object and at least one unprotected object, wherein the at least one protected object is provisioned with at least a guaranteed security service level agreement (SLA) and the at least one unprotected object is not provisioned with any guaranteed SLA;
    determining, by the central controller of the virtual network, an optimal mitigation action to ensure the at least one security SLA guaranteed to the least one protected object during the DoS attack, wherein the optimal mitigation action includes at least migrating any of the at least one unprotected and the at least one protected object to a different SLA zone; and
    executing the determined optimal mitigation action to mitigate the DoS attack, wherein the optimal mitigation action is facilitated by means of resources of the virtual network.

2. The method of claim 1, wherein the DoS attack is detected using at least any one of: a DoS attack detection tool and the central controller.

3. The method of claim 1, wherein checking if the DoS attack affects the at least one physical machine further comprises:
checking if the DoS attack is against the at least one protected object or the at least one unprotected object.

4. The method of claim 3, wherein each of the at least one protected object and the at least one unprotected object is a virtual machine, wherein the at least one protected object is assigned to a tenant.

5. The method of claim 4, wherein the different SLA zone is a high SLA zone, wherein the high SLA zone is at least a portion of the virtual network that includes computing, mitigation, and networking resources configured to provide the guaranteed security SLA to the protected entity.

6. The method of claim 4, wherein the optimal mitigation action includes diverting traffic directed to the at least one physical machine to a security system, wherein the security system applies one or more DoS mitigation techniques on the diverted traffic.

7. The method of claim 6, wherein diverting the traffic to the security system is performed by the central controller on-the-fly without prior provisioning of network elements of the virtual network.

8. The method of claim 6, wherein the different SLA zone is a low SLA zone, wherein the low SLA zone is at least a portion of the virtual network that includes computing and networking resources configured to merely allow execution of unprotected objects without any guaranteed security SLA.

9. The method of claim 6, wherein the determination of the mitigation action is based on at least one of: a configuration of the at least one physical machine, a current load of the security system, a current load of the computing and networking resources of the high SLA zone, and available computing and networking resources of the low SLA zone.

10. The method of claim 1, further comprising:
checking if the DoS attack is terminated; and
reverting to a configuration of the virtual network prior to the execution of the mitigation action.

11. The method of claim 1, wherein the virtual network is any one of: a software defined network (SDN) utilizing an OpenFlow provisional protocol and a SDN-based overlay network.

12. A computer software product embedded in a non-transient computer readable medium containing instructions that when executed by one or more processors perform process for efficient mitigation of denial of service (DoS) attacks in a virtual network to maintain a security service level agreement (SLA) guarantee to protected objects, the process comprising:
ascertaining, by a central controller of the virtual network, that a denial of service (DoS) attack is performed in the virtual network;
checking if the DoS attack affects at least one physical machine, the at least one physical machine hosting at least one protected object and at least one unprotected object, wherein the at least one protected object is provisioned with at least a guaranteed security service level agreement (SLA) and the at least one unprotected object is not provisioned with any guaranteed SLA;
determining, by the central controller of the virtual network, an optimal mitigation action to ensure the at least one security SLA guaranteed to the least one protected object during the DoS attack, wherein the optimal mitigation action includes at least migrating any of the at least one unprotected and the at least one protected object to a different SLA zone; and
executing the determined optimal mitigation action to mitigate the DoS attack, wherein the optimal mitigation action is facilitated by means of resources of the virtual network.

13. A central system of a virtual network for efficient mitigation of denial of service (DoS) attacks in the virtual network to maintain a security service level agreement (SLA) guarantee to protected objects, comprising:
a processor; and
a memory, the memory containing instructions that, when executed by the processor, cause the central system to be a central controller of the virtual network and configure the central system to:
ascertain that a denial of service (DoS) attack is performed in the virtual network;
check if the DoS attack affects at least one physical machine, wherein the at least one physical machine hosting at least one protected object and at least one unprotected object, wherein the at least one protected object is provisioned with at least a guaranteed security service level agreement (SLA) and the at least one protected object is not provisioned with any guaranteed SLA;
determine an optimal mitigation action to ensure compliance with the at least one security SLA guaranteed to the least one protected object during the DoS attack, wherein the optimal mitigation action includes at least migrating any of the at least one unprotected and the at least one protected object to a different SLA zone; and
execute the determined optimal mitigation action to mitigate the DoS attack, wherein the optimal mitigation action is facilitated by means of resources of the virtual network.

14. The system of claim 13, wherein the DoS attack is detected using at least one of: a DoS attack detection tool and the central controller.

15. The system of claim 13, wherein the system is further configured to:
check if the DoS attack is against the at least one protected object or at least one unprotected object hosted together with the at least one protected object in the at least one physical machine.

16. The system of claim 15, wherein each of the at least one protected object and the at least one unprotected object is a virtual machine, wherein the at least one protected object is assigned to a tenant.

17. The system of claim 16, wherein the different SLA zone is a high SLA zone, wherein the high SLA zone is the secured resource and includes at least a portion of the virtual network that includes computing, mitigation, and networking resources configured to provide the guaranteed security SLA to the protected entity.

18. The system of claim 16, wherein the optimal mitigation action includes diverting traffic directed to the at least one physical machine to a security system, wherein the security system applies one or more DoS mitigation techniques on the diverted traffic, and wherein the secured resource is the security system.

19. The system of claim 18, wherein the system is further configured to divert traffic on-the-fly without prior provisioning of network elements of the virtual network.

20. The system of claim 18, wherein the different SLA zone is a low SLA zone, wherein the secured resource is the low SLA zone, wherein the low SLA zone is at least a portion of the virtual network that includes computing and networking resources configured to merely allow execution of VMs without any guaranteed security SLA.

21. The system of claim 18, wherein the determination of the mitigation action is based on at least one of: a configuration of the at least one physical machine, a current load of the security system, a current load of the computing and networking resources of the high SLA zone, and available computing and networking resources of the low SLA zone.

22. The system of claim 13, wherein the system is further configured to:
   check if the DoS attack is terminated; and
   revert to a configuration of the virtual network prior to the execution of the mitigation action.

23. The system of claim 13, wherein the virtual network is any one of: a software defined network (SDN) utilizing an OpenFlow provisional protocol and a SDN-based overlay network.

* * * * *